United States Patent [19]

Rindal

[11] Patent Number: 4,637,044

[45] Date of Patent: Jan. 13, 1987

[54] PHASE SELECTABLE CIRCUIT FOR USE IN A STEREO DEMODULATOR

[75] Inventor: Abraham E. Rindal, Largo, Fla.

[73] Assignee: RCA Corporation, Princeton, N.J.

[21] Appl. No.: 600,881

[22] Filed: Apr. 16, 1984

[51] Int. Cl.[4] .............................................. H04H 5/00
[52] U.S. Cl. ......................................... 381/4; 328/24; 328/155
[58] Field of Search .......................... 381/2, 3, 4, 5, 27; 358/144, 198; 328/24, 155

[56] References Cited

U.S. PATENT DOCUMENTS

| | | | |
|---|---|---|---|
| 4,139,866 | 2/1979 | Wegner | 358/198 |
| 4,339,772 | 7/1982 | Eilers et al. | 358/144 |
| 4,379,264 | 4/1983 | Lenhardt | 328/24 |
| 4,395,687 | 7/1983 | Belohoubek | 328/155 |
| 4,512,031 | 4/1985 | Van Gils | 381/2 |

Primary Examiner—Forester W. Isen
Attorney, Agent, or Firm—Paul J. Rasmussen; Peter M. Emanuel; Adel A. Ahmed

[57] ABSTRACT

A circuit has two signal paths. The first path provides a signal with a selected magnitude and phase. The second path selectively provides either no signal or a signal with twice the magnitude and opposite phase with respect to that provided by said first path. The signals of the two paths are combined to provide a signal with a selectable phase. The circuit can be used in a stereo decoder in which an L+R stereo sum signal is combined with an expanded R−L stereo difference signal, provided by an expander also used for a SAP signal, to produce left (L) and right (R) stereo signals so that when the SAP signal is being reproduced, it is of the same phase in both left and right channels.

14 Claims, 1 Drawing Figure

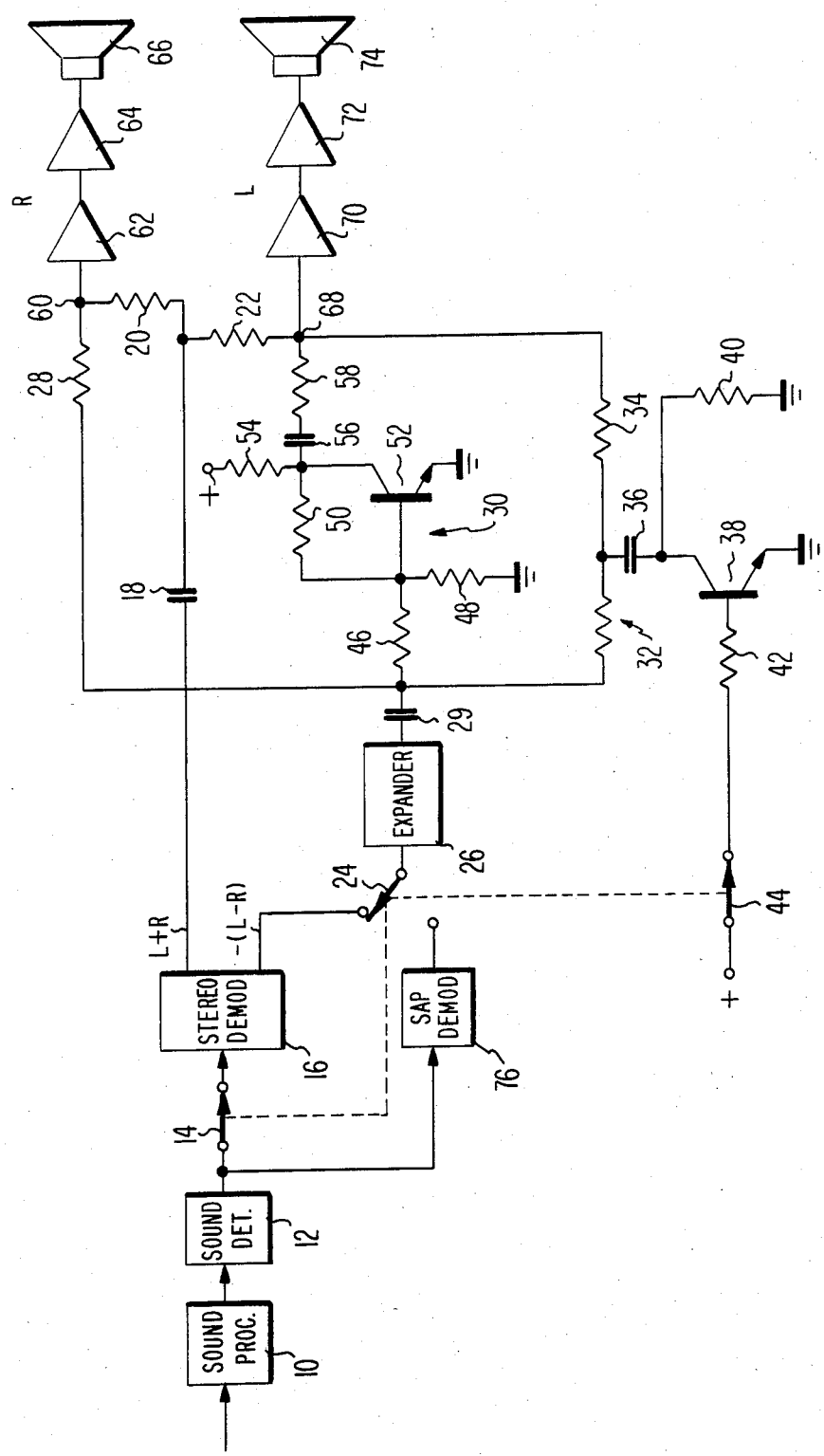

PHASE SELECTABLE CIRCUIT FOR USE IN A STEREO DEMODULATOR

BACKGROUND OF THE INVENTION

The present invention relates to a circuit with a selectable phase output signal, and more particularly to such a circuit for use in a television stereo decoder.

In the United States it has been proposed to transmit a television signal having stereo audio components. In one proposed system, known as the "Zenith" system, an L−R signal representing the difference between left (L) and right (R) stereo signals is transmitted as an amplitude modulated (AM) suppressed carrier at twice the horizontal scanning frequency. To maintain compatibility with existing monophonic (mono) receivers, a monaural signal, consisting of an L+R sum signal, is transmitted as a frequency modulated (FM) carrier in the conventional fashion. In a television receiver, the L+R and L−R signals are demodulated and then matrixed (added) to produce L and R signals. It has also been proposed to transmit an audio signal for a so called "second audio program" (SAP), e.g., for providing the main program in a second language. In the "Zenith" system, a frequency modulated carrier at five times the horizontal frequency is used for the SAP. For a more complete description of the Zenith system see pages 110-111 of "Television Multichannel Sound", Vol IA, published by the National Association of Broadcaster, Nov. 9, 1983; and also U.S. Pat. No. 4,339,772.

For both the L−R and SAP signals it is also proposed to use a so called "dbx" companding system in which variable preemphasis (compression) of high frequency components at the transmitter and complementary deemphasis (expansion) at the receiver is used in order to improve the signal-to-noise (S/N) ratio of the corresponding reproduced signals. The "dbx" companding system is described in detail in the publication entitled "Compandor Complexity Analyses" published by the Broadcast Television Systems Committee of the Electronic Industries Assocication (Supplement of Dec. 5, 1983). Basically, the purpose of providing substantial high frequency content in the transmitted signal is that it has been found that the greater the high frequency content of a transmitted signal the less perceptible will be noise (i.e., the more noise will be masked).

A companding system is not used for the L+R signal since, if it were, the ability of existing receivers to properly reproduce monaural signals would be disturbed. Furthermore, the transmitted L+R signal is less subject to being contaminated by interference than the higher frequency L−R or SAP signals.

For reasons of economy, it is desired to use the one expander for both the L−R and SAP signals. However, when this is done, it has been found that the SAP signal in one channel is out of phase with respect to the SAP signal in the other channel due to an inverter stage, which is required for stereo demultiplexing as will be explained below. The resulting sound emanating from the loudspeakers can be annoying to the listener.

SUMMARY OF THE INVENTION

In accordance with a feature of the present invention, selectable phase means is coupled between an expander and a stereo matrix for coupling either an L−R or SAP signal to the matrix. The selectable phase means comprises a first path providing a first signal having a first magnitude and a first phase. The selectable phase means also comprises a second path parallel coupled with the first path and provides either substantially no signal during stereo operation or a second signal of twice the first magnitude and a second phase opposite to the first phase during SAP operation. Thus, the addition of the first and second signals at the input to the matrix produces either the first signal or a third signal having the first magnitude but opposite the second, i.e., phase.

In a very inexpensive embodiment the first path comprises an inverting transistor amplifier and the second path comprises a pair of series coupled resistors with an bipolar transistor switch coupled to the junction thereof.

DESCRIPTION OF THE DRAWING

The sole FIGURE is a partly block and partly schematic diagram of a stereo decoder circuit constructed in accordance with the invention.

DETAILED DESCRIPTION

In the FIGURE, sound processor 10 receives a television intermediate frequency (IF) signal having a TV stereo sound component in accordance with the "Zenith" system. This signal can be derived from a conventional single channel IF circuit, but preferably is derived from the sound IF channel of a so called quasi-parallel IF circuit such as shown in FIG. 7 of "Intercarrier Buzz Phenomena Analysis and Cures" by P. Fochens and C. G. Eilers, IEEE Transactions on Consumer Electronics, Vol. CE-27, No. 3, August 1981, in order to minimize buzz in the demodulated audio signal. Specifically, the signal at the input of processor 10 has a sound component with a carrier at 41.25 MHz and a picture carrier at 45.75 MHz. Processor 10 mixes the picture carrier with the sound component and therefore provides a difference frequency sound signal at 4.5 MHz The output signal of processor 10 is applied to sound detector 12, which comprises an FM demodulator having a center frequency of 4.5 MHz. The output signal of detector 12 comprises a baseband L+R signal, a suppressed subcarrier at $2f_H$ conveying the compressed L−R signal as an AM component, and a subcarrier at $5f_H$ conveying the SAP signal as an FM component, all as in accordance with the combined "Zenith" system.

When switch 14 is positioned as shown for stereo operation, the output signal of detector 12 is applied to stereo demodulator 16 that provides a baseband L+R signal at one output and also demodulates the L−R component to provide an R−L or −(L−R) baseband signal at another output. The baseband L+R signal is coupled through blocking capacitor 18 to the junction of resistors 20 and 22, the purpose of which will be described below. The baseband −(L−R) signal is compressed and is therefore coupled through switch 24, which is positioned as shown for stereo operation, to expander 26 constructed in accordance with the "dbx" system. The output signal of expander 26 is the −(L−R) signal with its original dynamic range, i.e., the dynamic range before compression at the transmitter is restored. The restored −(L−R) signal is applied through DC blocking capacitor 29 to resistor 28, to a first path including inverting unity gain amplifier 30, and to a second path including series connected resistors 32 and 34. The junction of resistors 32 and 34 is coupled through DC blocking capacitor 36 having negligible impedance for the frequencies of interest to the collector of switching transistor 38 which is also coupled to signal ground through resistor 40. The base of transistor 38 selectively is coupled to a positive supply voltage through resistor 42 and switch 44. Switch 44 is ganged with switches 14 and 24 as shown by a dotted line in the drawing. Switch 44 is positioned as shown during stereo operation, causing base current to flow in transistor 38. Thus, transistor 38 is conducting and because the junction of resistors 32 and 34 is effectively shorted to signal ground, no signal is conveyed through the second path. Thus, the second path does not have an effect for stereo operation. Resistor 40 inhibits switching transients when the position of switch 44 is changed by biasing the collector of transistor 38 to the same potential as the emitter thereof, i.e., ground. Such switching transients might otherwise produce a corresponding audible transient which would be annoying.

Amplifier 30 comprises current limiting resistor 46 that applies the −(L−R) signal from expander 26 to the base of transistor 52. Resistor 50 provides negative feedback between the collector and base of transistor 52, and together with resistor 48 establishes the bias current for transistor 52. Resistor 54, coupled between a source of positive supply voltage and the collector of transistor 52 is the load resistor of amplifier 30. The values of resistors 46, 48, and 50 are selected so that amplifier 30 has unity gain. Amplifier 30 is an inverting amplifier due to the common emitter configuration of transistor 52. Thus, the signal at the collector of transistor 52 is an L−R signal. This L−R signal is applied to resistor 58 by way of DC blocking capacitor 56 which has negligible impedance for the frequencies of interest.

Resistors 20 and 28 comprise a first matrix and resistors 22 and 58 comprise a second matrix. Resistors 20, 22, 28 and 58 have equal values so that the signals coupled to these resistors are equally weighted in the respective matrixes. The −(L−R) signal coupled to resistor 28 is added to the L+R signal coupled to resistor 20 so that a 2R signal is developed at junction 60. The latter signal is amplified by driver amplifier 62 and by power amplifier 64 and reproduced by loudspeaker 66 of a right audio signal channel. The L+R signal coupled to resistor 22 is added to the L−R signal coupled to resistor 58 so that a 2L signal is developed at junction 68. The latter signal is amplified by driver amplifier 70 and power amplifier 72 and reproduced by loudspeaker 74 of a left audio channel.

It will be seen that amplifier 30 is required to be an inverter for the −(L−R) signal for proper matrixing to obtain the left audio signal. It is noted that even if stereo demodulator 16 provided the L−R signal rather than the −(L−R) signal, an inverter for the L−R signal would be needed for proper matrixing to obtain the right audio signal. In the latter case, the right and left channels would be interchanged, e.g., elements 62, 64, and 66 would be for the left audio signal and elements 70, 72 and 74 would be for the right audio signal. Further, even if demodulator 16 provided (L−R) and −(L+R) signals, a first inverter would be required for the −(L+R) signal for matrixing to obtain the left channel signal. A second inverter in either the right or left channels would be required to obtain proper phasing for the stereo signals. This second inverter would make the phasing incorrect for the SAP signal, i.e., the selectable phase inverter of the present invention is required.

If it is desired to listen to the SAP signal, then switch 14 is placed in its opened position, switch 24 is placed in its lower position, as viewed in the FIGURE, and switch 44 is also placed in the opened position. Thus, stereo demodulator 16 does not provide L+R and −(L−R) output signals. However, since sound detector 12 is coupled to SAP demodulator 76, a baseband SAP signal is coupled to expander 26 and the SAP signal with its original dynamic range restored is provided at the output of expander 26. The restored SAP signal is applied to resistors 28 and 32 and amplifier 30. Since no L+R signal is applied to resistor 20, the signal at junction 60 comprises just the SAP signal. As a result, an SAP audio response is produced by right speaker 66. Assume, for the moment, that the second path comprising resistors 32 and 34 were not present (which is effectively the case when switch 44 is closed rendering transistor 38 conductive as explained above for stereo reproduction). In that case, since the SAP signal at the output of amplifier 30 is phase inverted with respect to the SAP signal at the input of amplifier 30 and is applied to resistor 58 and since no −(L−R) signal is applied to resistor 22, only the phase inverted SAP signal at resistor 58 will be applied to junction 68 and therefore, the SAP audio response produced by left speaker 74 will be out-of-phase with respect to the SAP response produced by right speaker 66. As a result, the combined SAP audio response will be significantly distorted, i.e., low frequencies will cancel.

However, when switch 44 is opened for SAP operation, rendering transistor 38 non-conductive, the second path comprising resistors 32 and 34 is effective to couple the non-inverted SAP signal from the output of expander 26 to junction 68, which junction also receives the inverted SAP signal from the output of amplifier 30. Resistors 32 and 34 are selected to provide a total series resistance of about one half that of resistor 58. Thus, the SAP signal provided by the second path to junction 68 has twice the magnitude and the opposite phase as the SAP signal provided by resistor 58. As a result, the resultant SAP signal at junction 68 of the left channel is in-phase and has about the same magnitude as the SAP at junction 60 of the right channel. The exact values of resistors 32 and 34 are not critical, since for SAP operation, exact channel balance is not required.

What is claimed is:

1. Apparatus comprising:
    a stereo demodulator providing a demodulated stereo sum signal and a demodulated and compressed stereo difference signal;
    a SAP demodulator providing a demodulated and compressed SAP signal;
    first switch means coupled to said stereo and SAP demodulators for selecting said stereo difference signal in a first position and said SAP signal in a second position;
    an expander coupled to said first switch means for providing an expanded stereo difference signal when said first switch means is in said first position and for providing an expanded SAP signal when said first switch means is in said second position;
    first summing means coupled to said stereo demodulator signal and to said first switch means for providing one of a right audio signal and a left audio signal as an output signal when said first switch means is in said first position and for providing a first SAP audio signal as an output signal when said first switch means is in said second position;
    selectable phase means coupled to said expander for providing an inverted expanded stereo difference signal when said switch means is in said first position and for providing a noninverted expanded SAP signal when said switch means is in said second position;

second summing means coupled to said stereo demodulator and said selectable phase means for providing the remaining one of said left and right audio signals as an output signal when said first switch means is in said first position and for providing a second SAP audio signal, having the same phase as said first SAP audio signal, as an output signal when said first switch means is in said second position.

2. Apparatus as claimed in claim 1, wherein:
said stereo difference signal represents the difference between right (R) and left (L) audio signals in the form of R−L signal.

3. Apparatus as claimed in claim 2, wherein:
said first and second summing means respectively provide right and left audio signals when said switch means is in said first position.

4. Apparatus as claimed in claim 1 wherein:
said selectable phase means includes a first path conveying a first signal of a first magnitude and a first polarity between an input and an output; and a second path coupled in parallel with said first path conveying substantially no signal between said input and said output when said first switch means is in said first position and for conveying a second signal of a second magnitude substantially equal to twice said first magnitude and of a second polarity opposite to said first polarity.

5. Apparatus as claimed in claim 4, wherein:
said first path comprises an inverting amplifier coupled between said input and said output.

6. Apparatus as claimed in claim 5, wherein:
said second path includes a pair of resistors coupled in series between said input and said output; and second switch means coupled to the junction of said resistors and operating in concert with said first switch means.

7. Apparatus as claimed in claim 6, wherein:
said inverting amplifier is a bipolar transistor amplifier.

8. Apparatus as claimed in claim 7, wherein:
said second switch includes a bipolar transistor.

9. Apparatus for coupling a signal between an input and an output with a selected one of first and second opposite phases comprising:
a first path conveying said signal between said input and said output with a first magnitude and with a first polarity; and
a second path coupled in parallel with said first path and including switch means for determining that in a first position of said switch means said second path conveys substantially no signal between said input and said output and in a second position of said switch means said second path conveys said signal between said input and said output with a magnitude greater than said first magnitude and with a second polarity opposite to said first polarity.

10. Apparatus as claimed in claim 9 wherein:
said second magnitude is substantially twice said first magnitude.

11. Apparatus as claimed in claim 10, wherein:
said first path comprises a transistor inverting amplifier.

12. Apparatus as claimed in claim 11, wherein:
said second path comprises a pair of resistors coupled in series between said input and said output; and
said switch means comprises a transistor coupled to the junction of said resistors.

13. Apparatus as claimed in claim 12, wherein:
said transistor comprises a bipolar transistor.

14. Apparatus as claimed in claim 12, wherein:
said first path comprises a transistor inverting amplifier.

* * * * *